United States Patent
Cuende Alonso

(10) Patent No.: US 9,390,621 B2
(45) Date of Patent: Jul. 12, 2016

(54) SYSTEM AND METHOD FOR MEASURING THE REAL TRAFFIC FLOW OF AN AREA

(71) Applicant: CUENDE INFOMETRICS, S.A., Alcobendas (Madrid) (ES)

(72) Inventor: Daniel Cuende Alonso, Las Rozas (ES)

(73) Assignee: CUENDE INFOMETRICS, S.A., Alcobendas (Madrid) (ES)

( * ) Notice: Subject to any disclaimer, the term of this patent is extended or adjusted under 35 U.S.C. 154(b) by 0 days.

(21) Appl. No.: 14/729,092

(22) Filed: Jun. 3, 2015

(65) Prior Publication Data

US 2015/0356868 A1  Dec. 10, 2015

Related U.S. Application Data

(60) Provisional application No. 62/007,558, filed on Jun. 4, 2014.

(51) Int. Cl.
| | |
|---|---|
| *G08G 1/01* | (2006.01) |
| *G06K 9/00* | (2006.01) |
| *G01C 21/36* | (2006.01) |
| *G08G 1/04* | (2006.01) |
| *G06T 7/20* | (2006.01) |

(52) U.S. Cl.
CPC .............. *G08G 1/0125* (2013.01); *G01C 21/36* (2013.01); *G06K 9/0063* (2013.01); *G06T 7/2093* (2013.01); *G08G 1/0104* (2013.01); *G08G 1/04* (2013.01)

(58) Field of Classification Search
None
See application file for complete search history.

(56) References Cited

U.S. PATENT DOCUMENTS

| | | | | |
|---|---|---|---|---|
| 5,999,877 A | * | 12/1999 | Takahashi | G06K 9/00785 340/905 |
| 8,576,069 B2 | * | 11/2013 | Nadeem | B60H 3/00 340/539.25 |
| 2013/0287261 A1 | * | 10/2013 | Lee | G08G 1/0145 382/104 |

* cited by examiner

*Primary Examiner* — Nirav G Patel
*Assistant Examiner* — Brian Shin
(74) *Attorney, Agent, or Firm* — Wenderoth, Lind & Ponack, L.L.P.

(57) ABSTRACT

A system and method for measuring a real traffic flow of an area use images of vehicles and pedestrians taken from the sky in time intervals of an area. The system and method also use continuous tracking data for vehicles and pedestrians, provided by navigator manufacturers, map providers, route applications or by phone carriers. Both images and continuous tracking data are combined and processed by a processor that applies image pattern recognition software to the images so that each vehicle and pedestrian in the images is recognized and labeled for which tracking data is available. The system identifies vehicles and pedestrians contained in both databases and applies a weight to thereto. Accordingly, the system and method are able to estimate the traffic flow and the total number of vehicles and pedestrians for a particular time and area.

14 Claims, 4 Drawing Sheets

SYSTEM AND METHOD FOR MEASURING THE REAL TRAFFIC FLOW OF AN AREA

FIELD OF INVENTION

The field of the invention is related to information regarding traffic flow, volume, forecasting and population patterns of an area. The area can be a city, a town, a country or a continent.

The information of traffic flow is a key factor for road building, city planning, for infrastructure development, emergency situations, commerce development, traffic jam control, advertising, real estate and, of course, for trip schedule and journey planning. The information, if available, is used by the government, companies and people.

BACKGROUND

Currently, the systems and methods for measuring traffic volume and flow in cities are expensive and not homogenous. Consequently, the systems and methods of state of the art lack detail and extension. The known systems and methods go from traffic count bands to cameras, from interviewing people to use of the police to make an estimation. Most of the known systems and methods lack many features such as update processes, traffic patterns, profiling for individuals, and a same level of detail information for all the streets (not only where there is a "count band" or "Traffic Camera"). Other approaches use data from GPS car navigator providers or from mobile telephone carriers but they lack demographics due to privacy legal issues and are very biased dependent on market penetration.

SUMMARY

The present disclosure is directed to a system and method for measuring the real traffic flow of an area, in accordance with embodiments of the present disclosure. In one embodiment, the system and method of the present disclosure make use of a combination of sources, but mainly two. One is hi-definition images of an area (city, town, country or continent) from the sky, normally obtained with satellite images and another is data collected by devices that are tracked, such as cell phones, smart phones, car navigators, and/or beacons, among others. In the context of the present disclosure, those vehicles and/or pedestrians carrying a tracking device are called "probes", and those vehicles and/or pedestrians that carry a tracking device plus those vehicles and/or pedestrians that do not carry a tracking device are called "elements". Therefore, "elements" comprises all the "probes" plus the rest of vehicles and people in the area. The method gathers data from satellites (aerial images) and tracking devices (tracking data) and creates a real accurate estimation of the traffic flow, the total amount of traffic at any given time. The system and method of the present disclosure also provide the patterns and behaviors of the city population. The system and method of the present disclosure provide detailed information of every single street of any area (city, town, country or continent), second by second, aggregated, historical, forecast, distributed by profile, type of vehicle, origin-destination and even with an estimation of journey purpose. All this is accomplished, in a passive way, without the collaboration of the individuals, or making surveys. This is done by indirect measurements and analysis. Taking advantage of technologies and infrastructure already deployed for other purposes, so the costs are incredibly lower than a specific system for this goal and the results are much more accurate, detailed and applicable worldwide.

The system is passive and non-intrusive and does not require collaboration of the citizens. The system can also be enhanced with other auxiliary sources such as traffic (vehicular and pedestrian) counts, cameras in streets, surveys, questionnaires, geomarketing data, census, carrier data from mobile operators, beacons and/or NFCs (Near Field Communications).

A first aspect of the invention is to provide a system for measuring the real traffic flow of an area. The system for measuring the real traffic flow of an area comprises: i) images taken from the sky (from satellites, planes, drones or any technology that allows a view (almost vertical) of the streets of the area) in time intervals of an area; ii) continuous tracking data of a probe (tracked vehicle, tracked pedestrian) that is collected and provided by navigator manufacturers, map providers, route applications or by phone carriers that record the cell towers, traffic counts (vehicular and pedestrian), router connections and beacons that are able to geolocate the probe. The continuous tracking data comprises at least the longitude, latitude for each time unit for which the probe is tracked; iii) a database of universe of elements that comprises the images; iv) a continuous database that comprises the continuous tracking data; and, v) a computer processor.

In one embodiment, the computer processor is configured to: i) apply image pattern recognition software to the images taken from the sky so that each element comprised in the images is recognized, labeled and at least its longitude, latitude, time, speed and type of vehicle or number of pedestrian is calculated; ii) allocate to each probe the continuous tracking data for which the longitude, latitude and time match; iii) calculate a ratio between the number of elements recognized in the images and the number of probes for which the longitude, latitude and time match; and, iv) estimate the flow and the total number of elements within an area by applying the calculated ratio to the continuous tracking data for a particular time for which an image from the sky is not available.

In one embodiment, the computer processor is further configured to: calculate a pattern for each probe based on the continuous tracking data; and, calculate a profile by analyzing the combinations of calculated patterns.

Another embodiment of the system provides that the images are provided by at least one aerial device. Specifically, the at least one aerial device may be selected from a satellite, a plane, an aircraft, a drone and any combination thereof.

Another embodiment of the system provides that the probe is selected from a tracked vehicle and a tracked pedestrian or group of tracked pedestrians.

Another embodiment of the system provides that the area is selected from a street, a suburb, a city, a town, a country and a continent.

Another embodiment of the system provides that the images are selected between photos and moving frames.

A second aspect of the invention is to provide a method for measuring the real traffic flow of an area. The method comprises: i) generating a database of universes (UDB) which stores images taken from the sky in time intervals of an area; ii) recognizing, by means of a processor, each individual element comprised in each stored image and calculating at least the following data of each individual element: latitude, longitude, time, speed and type of vehicle or number of pedestrian; iii) generating a continuous database (CDB) which stores continuous tracking data of each individual probe, the continuous tracking data comprising at least the estimated position by longitude and latitude, map cell and vector position, for each time unit; the continuous tracking data being obtained from each tracking device carried by each individual probe; iv) allocating to each individual element recognized in step ii) the continuous tracking data of step iii) for which the longitude, latitude and time match; v) calculating a ratio between the number of elements recognized in the images and the number of probes for which the longitude, latitude and time match; and vi) estimating the flow and the total number of elements within an area by applying the calculated ratio to the continuous tracking data for a particular time for which an image from the sky is not available.

In one embodiment, the method for measuring the real traffic flow of an area further comprises: calculating a pattern for each probe based on the continuous tracking data; and, calculating a profile by analyzing combinations of the calculated patterns.

In one embodiment, the step of "generating a database of universes (UDB)" (step i) above-mentioned) further comprises the following sub-steps: i) defining of a Universe region that it is the composition of several images; (normally this is a Metropolitan area of the whole city, including suburban areas, ring roads, etc.; any zone that is influenced by the city and is desired to be analyzed); ii) selecting different source data of aerial city images such as satellites, airplanes, drones, with latitude and longitude and synchronized timestamp (pictures and movies can be taken during different periods of time and days); iii) normalizing the input image (color contrast, orthophoto, edit, eliminate clouds, etc.—images may have overlapping areas that will be fused and mixed to correct and represent the reality of two different times); iv) generating a chronogram of the different images and regions to sync later with the snapshot of the Continuous database (CDB); and v) counting Vehicle and pedestrian (individual probe) Analysis. Optionally, a further sub-step is provided: vi) correction and enhancement of the data, which comprises: a) matching to a vector navigation map; b) correcting the effect of traffic lights, traffic jams for possible false positives as parked cars; c) deducing the movement and trajectory for each single element before the snapshot and after the snapshot (project to the past and to the future based on the current position); d) forecasting movement for each single element based on type of road and type of element. For example, if a car is in a highway, it will be at least all the time until it finds an exit; and e) identifying regions and locations that will be excluded or will require a different analysis. For example, airports, cars in restricted areas, military, etc. Finally, the step of "generating a database of universes (UDB)" comprises the sub-step vii) of counting elements consisting of: a) counting by segment of the street, number of vehicles, cars, buses, motorbikes, moving and parked, people and static elements: for each picture; and/or for total pictures in a period of time; and b) counting a total for the city, for each picture; and/or for total pictures in a period of time;

In one embodiment, the vehicle analysis comprises: a) mapping correlation of roads (to simplify and expedite the analysis of the streets, roads and car parks are placed as vectors in the images to highlight where it is possible to find elements, this will narrow the search areas and optimize the process); b) calibrating of the process: defining the objects for the image recognition, such as car, type, model, bus, truck, motorbike, bicycle, bus shelter, billboard, kiosk, urban furniture, pedestrian, etc.; c) processing the images with the image pattern recognition software. This process takes into account not only the visible range, but, if it is available, other wave lengths from the spectrum such as infrared or ultraviolet, and the type of analysis provides more information such as if the car (object or individual probe) is moving or parked, the orientation of the movement, speed, etc. The process inserts a record for each element found in the image, the fields including: time, image reference, position (i.e. latitude/longitude), element flow type (Static, moving), element class (Car, Bus, Kiosk, pedestrian, etc.), shape, model/color/characteristics, parked (if applicable), speed, orientation vector, path (if applicable) and vehicle dimensions.

In one embodiment, the step of "generating the Continuous Database (CDB)" (step iii) mentioned above) further comprises the following steps: a) input processing of data files from the source. Depending on the source data provider, files and input form may vary, from text files, xml, db files, etc. Each data provider has a specific type of data and this defines the structure of the database. In some cases, the access to the data is in raw mode, this means direct readings from the probes, and in other cases, the data has had some cleaning, laundry, filtering, and aggregation. The main files to import are: Raw data; Model statistics (aggregation of raw data) if available; Statistics and data for model validation; b) anonymizing individual data, if required; c) cleaning, validation, and consistency analysis; d) filtering Probes to meet the criteria of the universe; e) geopositioning of the probe to match map coordinates; f) and journey calculation. Once identified, for each probe, a sequence of point by point positions (lat/long) to define a "journey" has to be created. Also, stand by time, pauses, speed, origin, destiny, reason, type of transport, duration, etc.; g) pattern recognition of probes such as: checking consistency of the journeys per Probe per day, week and month; and continuity across time, repeated places and locations, such as home, work, gas-stations, leisure areas, malls, shopping, schools, etc.; and h) profiling. Each probe, based on its pattern will have an affinity to different profiles and demographics so a probabilistic approach will match a "profile", not only of a journey pattern but also with other sources such as census information, surveys, questionnaires, geomarketing data, proximity to points of interest, population density, borough, type of district, etc.

In a third aspect of the disclosure, a method for calculating a traffic re-generation is provided. The method for calculating a traffic re-generation, applying the system and method of the present invention to the databases CDB and UDB, comprises the following steps: i) per image, identifying the elements from the CDB in the UDB, in each segment of the street at the time the picture was taken (snapshot). All probes will be located and match to an element of the UDB because the UDB is a snapshot (or movie) of the same time. These probes are the seed vehicles, they become the sample; ii) analyzing the ratio and weighting among seed elements (probes that came from the CDB) and the total elements in each segment of the street at the very same moment. This process will be repeated for each image of the UDB. With more images or movies, the better and more accurate the weighting and ponderation of the elements will be; iii) one output is to adjust and weight the probes. Depending on the analysis, this can be done per time frame, day, weekday/weekend, by region, or by type of element (for example, only motorbikes); iv) another output is the generation of the traffic of the city, using each single element of the UDB moved by the pattern criteria obtained from the CDB.

In a fourth aspect of the disclosure, a method for measuring the real traffic flow of an area for which an individual element cannot be identified is provided. The method combines the two databases (Database of Universes "UDB" and Continuous Database "CDB") when each individual element cannot be identified in the image stored from the UDB applying the following steps:

looking for the elements of the CDB which were active at the time of the image of the UDB (active=those in movement; this can be known when a sequence of images are taken);

assigning a weight to each probe of the CDB in terms of elements (UDB) with matching. A simple calculation of the ratio could be, for example, on the same route (street) 53 vehicles (UDB) for 7 CDB. That means that, for that time, each probe of CDB represents 7.57 vehicles (i.e., ratio of 53/7);

repeating this process for each image and combine the weights obtained. If CDB probes have more than one assigned weight, the weights will have to be combined. One option would be directly multiply, but something more advanced would be varying the weight with the time (so that the weight goes gradually from one to another);

the above combination of weights can take into account whether it is a weekend or a working day, summer or winter;

these weights could be distributed among those CDB probes that never match with the UDB elements by matching with other CDB probes already weighted.

In a fifth aspect of the disclosure, a method for measuring the real traffic flow of an area for which an individual element cannot be identified is provided. The method may combine the two databases (Database of Universes "UDB" and Continuous Database "CDB") when each individual element cannot be identified in the image stored from the UDB applying the following steps: i) making UDB elements move according the movement patterns used more by the CDB movements and assigning probabilities of "looking" to them; ii) generating movement patterns with the information collected from the CDB in the selected period (days, weeks, months); and iii) for each image of the UDB: a) looking for the probes of the CDB that were "active" at the time the photo was taken; and, b) virtually moving each element of the image (UDB) depending on the movement patterns of the CDB.

In a sixth aspect of the disclosure, a method for measuring the audience of an advertisement item comprising the step of applying the method and/or the system for measuring the real traffic flow of an area of the present invention. The method for measuring the audience of an advertisement item for which the longitude and latitude are known comprises combining all or part of the following devices: i) Continuous Database (CDB): a) built-in GPS navigators; b) external GPS navigators; c) GPS devices installed on mobile phones; specific mobility studies, etc.; d) traffic bands for measuring the traffic; e) cameras installed for monitoring the traffic; f) beacons; and g) mobile phone data; ii) aerial images (generating the database of universes (UDB) using: a) satellites; b) aircraft; and c) drones, etc.; iii) demographic surveys, which provide features of the individuals such as: sex; age, role, social class, and media consumptions; iv) points of interest (POIs) which provide the individuals of the CDB which have passed through the POI, or very close to the POI or even not too far away from the POI; and provide the elements for which an audience measurement is desired to be calculated based on closeness/distance/visibility criteria of the POI.

DETAILED DESCRIPTION OF THE EXEMPLARY EMBODIMENTS

Figure 1:
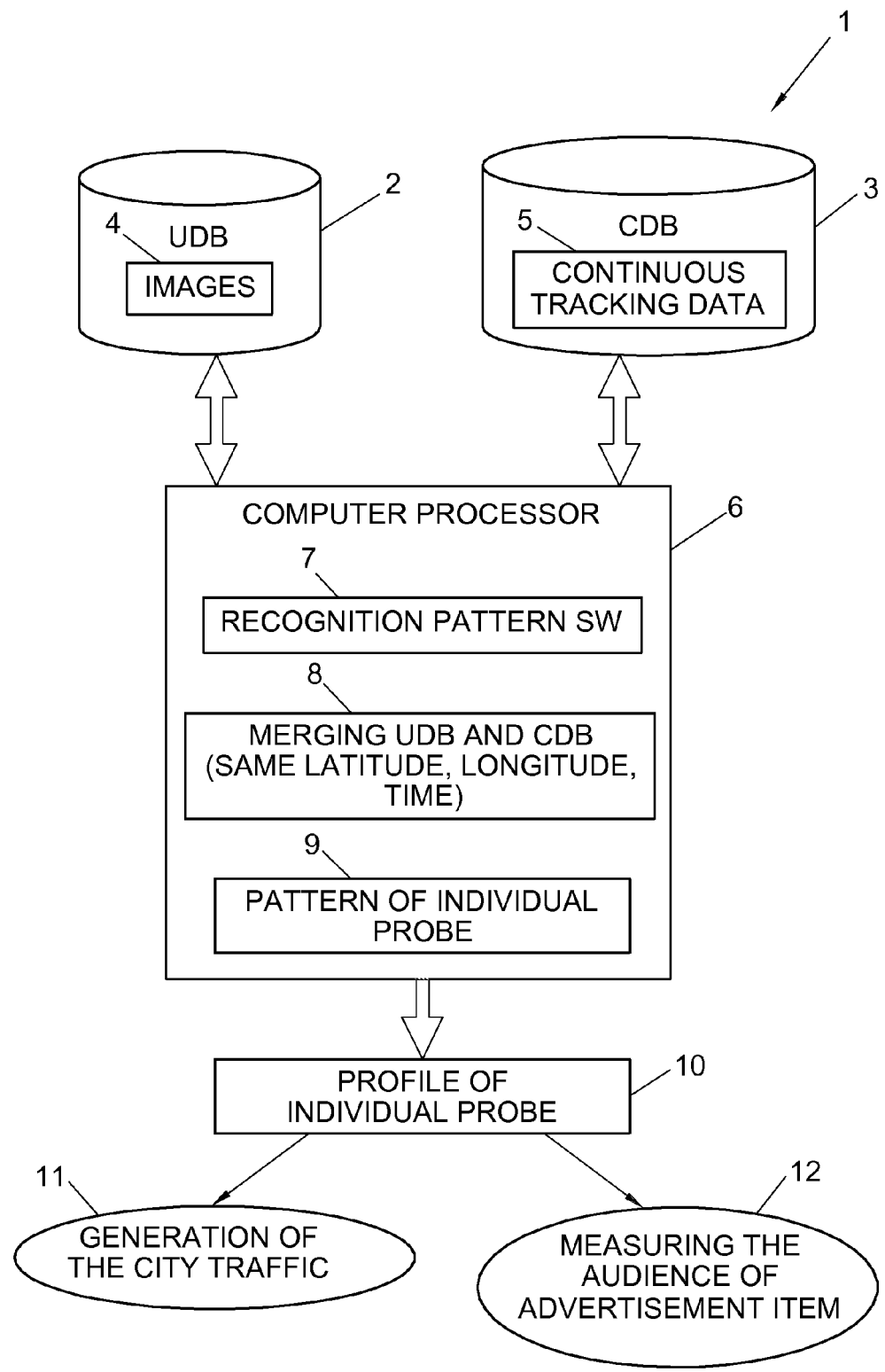
FIG. 1 is a flow chart of an embodiment of the system according to the present invention.
Figure 2:
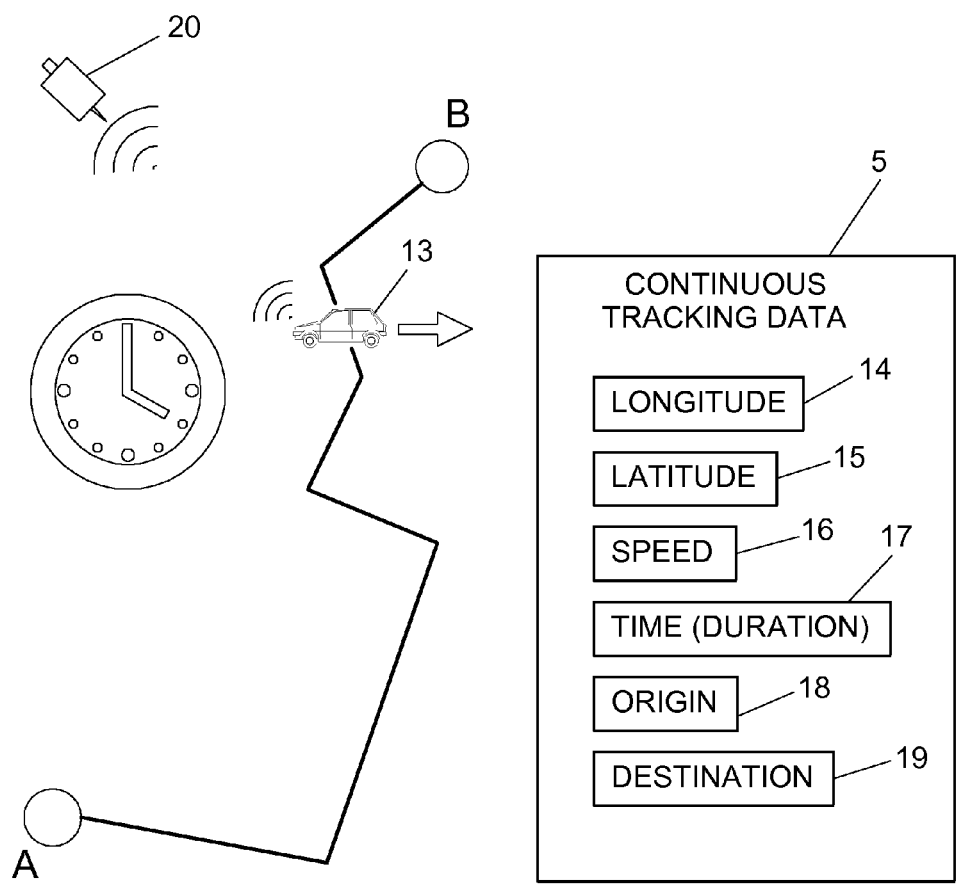
FIG. 2 illustrates data provided by a GPS manufacturer.
Figure 3:
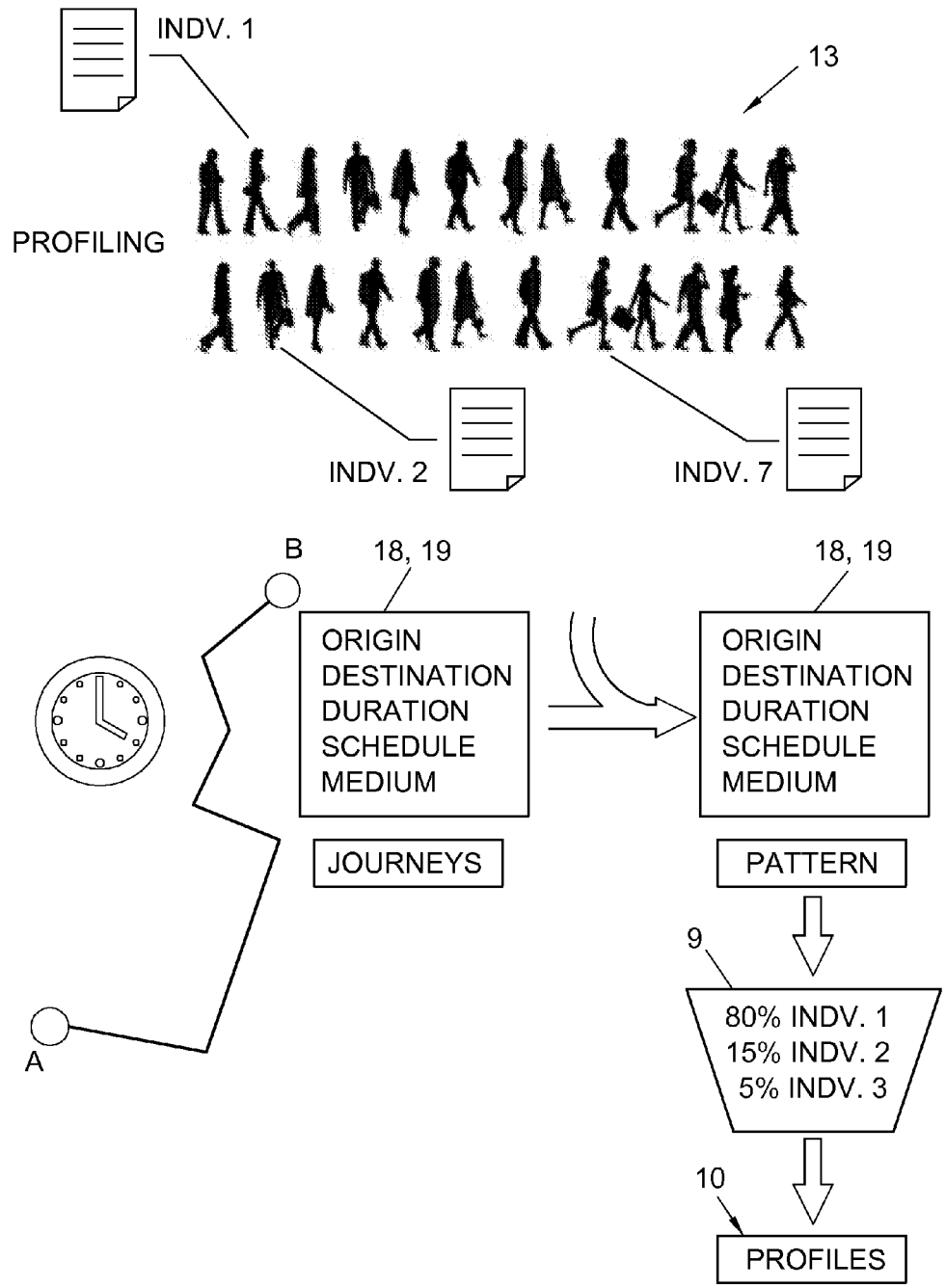
FIG. 3 illustrates data provided by a GPS manufacturer and data regarding profiles of individuals.

According to FIGS. 1 to 3, there are several data sources for the creation of the system 1, but the main one, Database of Universes 2, used as a foundation for the analysis is the image 4 of the area (city, town, country or continent) from the sky. These pictures can be taken by a satellite 20, planes, drones or any technology that allows a view (almost vertical) of the streets of the city. In accordance with the preferred embodiment, satellite images 4 are used, but other sources can also be used. The requirement is the high quality of those images that should allow for simage recognition pattern software 7. It can be still photos or moving frames but quality is essential. Normally, this kind of information is immediate, at a given time and it is not continuous in time due to the difficulty and cost to keep a camera in the sky at the same position for a long period of time, this only happens using geostatic satellites. The system and method of the present invention take into account this standard limitation, but of course, can implement continuous satellite image tracking. The current state of the art provides high definition images of any zone of the planet in less than 3 hours. Another way to take aerial images is by airplane/drone flight above the area (city, town, country or continent), this normally results in a more expensive procedure, administrative process, and license and it cannot be arranged so quickly as to have hundreds of cities at the same time as using a satellite image. But of course, if the data/images are available, they can be used in the system in a similar way as the satellite images. Again, the main factor is quality. The composition of aerial images provides the Universe region (Database of Universes 2). An aerial image provides the real situation of an area for a particular time. However, the aerial image (instant photo) does not provide information about the element (vehicle, pedestrian) comprised therein, but at least data regarding latitude 15, longitude 14, time (geolocation data) 17, speed 16, type of vehicle 13 and number of pedestrians can be calculated from the aerial images.

Another data source of the system is the continuous tracking data 5 for each probe (tracked vehicle, tracked pedestrian). This information is collected by navigator manufacturers such as TomTom®, map providers such as Google®, route applications such as Waze® or by phone carriers that record the cell towers, router connections, geofencing and/or beacons that are able to geolocate their clients on regular basis. It is important to stress that the information provided by these databases are not just the volume or counts per street, but the information of each journey and location, this is the sequence of segments of a street, the order and time that the probe is moving from origin 18 to destiny 19 or is located in an area. Also, travel patterns may be obtained by questionnaires, tracking and surveys.

Once the information is collected, i.e., the images 4 are gathered in the Database of Universes 2 and the continuous tracking data 5 are gathered in the Continuous Database 3, the computer processor 6 applies the image pattern recognition software 7 to the images 4 for calculating latitude, longitude, time, speed and type of vehicle or number of pedestrians. In order to do so, the computer processor 6 merges 8 the data contained in both databases. The vehicle or the pedestrian is identified when its longitude, latitude and time (or timestamp) are the same for the data contained in both databases. The pattern is a repetitive action for a vehicle or a pedestrian moving from the origin to the destination. For instance, the same journey at the same time, each working day. Thus, the computer processor 6 can calculate the pattern 9 based on repetitive moving actions (journey, trips) of the probes. When several probes (vehicles, individuals) repeat (more or less) the same journey, it turns out in a pattern. Thus, the computer processor 6 can calculate the profile of each probe 10 based on combinations of patterns.

The profile of individual probes is useful for generating the city traffic 11 and/or for measuring the audience of an advertisement item 12.

Other data sources enhance the data and enrich the analysis, for example the Points of Interest in the city, for example, fast food restaurants, cinemas, malls, gas stations, leisure areas, gyms, business areas, parking lots, airports, hospitals, etc., these data layers enable understanding of the patterns and the reasons for the movements. Other sources are traffic counts inside malls (footfall). Other data sources are obtained from the "beacon" technology that counts and identifies the Smartphone devices that are within its range. Other information like traffic and pedestrian counts, census data, allow for calibration and adjustment of the information.

From the continuous database "CDB", the information collected is, for each probe, its position (i.e. longitude and latitude), time and speed. This is because each individual probe (tracked vehicle or tracked pedestrian) is carrying his cell phone or car navigator. Those devices usually send the information to the manufacturer, for technical reasons such as optimization of the antenna tower, cell grid, etc. so it can also send back updates of the traffic ahead, update maps and provide feedback. But the result is that the manufacturer or service provider collects millions of individual journeys, of course, in an anonymous way due to privacy laws that apply in each country. But that information gathered is bypassed and very skewed to represent the whole population due to the specificity of the provider, as, for example, phone carriers do not all have similar penetration among all segments of the population, as is similar with car manufacturers, software providers, etc. All those sources are detailed in the information they gather of each device, but they lack representativeness of the whole universe/population, and lack demographic profiling information such as age, gender, etc. In some cases, the data is in aggregated format (normally due to privacy issues or simple processes).

On the other side, with aerial city (town, country, continent or any other type of area) images, a complete picture of the city in one snapshot is obtained. Furthermore, a high definition view of all the streets of the city at any given moment is obtained. In fact, the state of the art in this area allows not only the procurement of an image of the "visible" spectrum, but also the procurement of information in ultraviolet, infrared/thermal, and other ranges of the light spectrum that allow a deep level analysis. The system and method of the present invention work at least with the visible spectrum (photo) of the city, but the system and method of the present invention improve the accuracy and the detail using other cameras at different wave lengths (infrared, etc.). Currently, a "legal" satellite image can be a 30 centimeter resolution per pixel, this allows the system of the present invention (by means of a computer processor) to use advanced image analysis software (also known as image pattern recognition software) for object recognition, to identify each vehicle, type and orientation and if it is moving or parked, and speed. Using more complex techniques that involve using other ranges of the wave spectrum, the information can be more detailed and accurate so as to even identify people walking. With this analysis, the method and system of the present invention can scrutinize the complete city, count all the cars, type and model, trucks, motorcycles, and even people walking that are in any given moment in the city area and in each segment of the street. This information has never been available before, only made by estimations and projections to get an approximate idea. But now, with these images and some computing power, the system and method can count the complete universe of vehicles any day, any moment of a street, city, a country or even a continent.

The system and method of the present invention have as inputs two main sources, one provides the real universe of vehicles and pedestrians, street by street, segment by segment, of an overall city area but it comes from a snapshot or for a short period of time (while the satellite is above the city). The other source, provides complete detailed information of several thousands of journeys of individuals, second by second, its position and speed during long periods of time, weeks, months, even years. It provides a "longitudinal" dimension of the data. This "longitudinal" dimension of the data is stored in the Continuous Database "CDB".

With the Continuous Database "CDB", the system and method of the present invention can trace each individual probe journey across time. This provides rich information of the patterns of the individual probe. In the case of aggregated data, it can also be managed in several ways, making virtual probes at a lower dimension of the aggregation, or using the information at that level to feed the model. When the continuous tracking data is provided as aggregated data, the probe is not only one tracked vehicle or a tracked pedestrian, but a group of tracked vehicles or tracked pedestrians which cannot be individually identified. Though the group of probes cannot be individually identified, it is considered that all tracked vehicles or tracked pedestrians within the group share the same longitude and latitude for a particular time. Aggregated data is especially useful when images are provided with low resolution and/or a particular privacy Law does not allow provision of the parameters in an individual way. The system and method of the present invention can combine the rich information with Points of Interest, places that an individual probe visits frequently, turning out a profile based on probabilities. So, for example, how often the probe stays by night in one place can be identified as home, where the probe goes during week days during working hours can be identified as business/work location, if the area is a university/school, it can be identified as "High probability to be a student". Other places such as malls, gyms, cinemas, shops, etc. will add more and more granularity to the profile. A deeper analysis will use the combination of those probes including the pattern, for example, a profile of people that go to McDonalds but do not go to Burger King even if it is in proximity of home/work in the last year, during weekends. Or people who drive more than 30 minutes to work even though they have public transportation with the same route. The combination of these probes provides an infinite number of possibilities and analysis.

Figure 4:
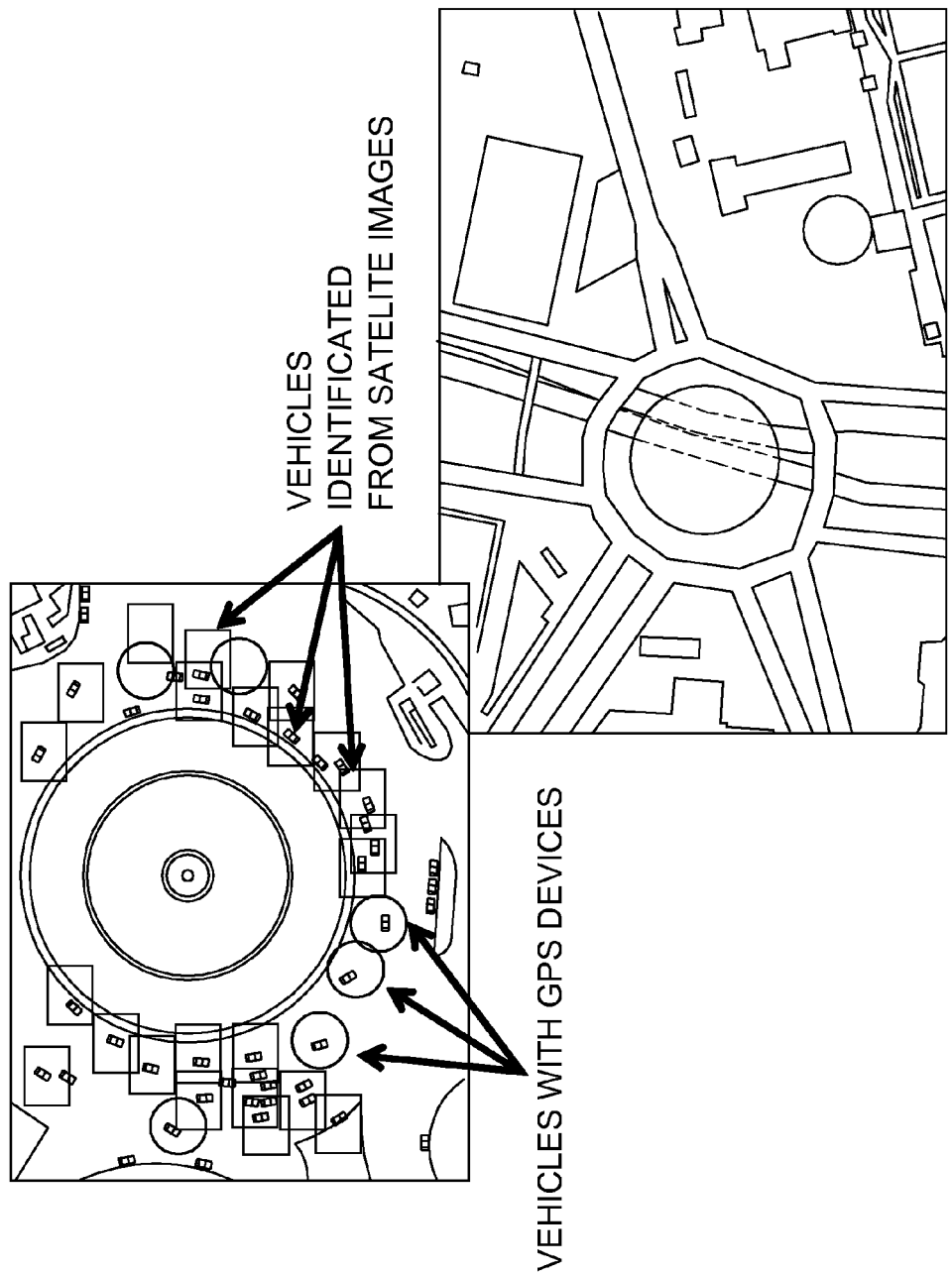
FIG. 4 illustrates an exemplary traffic density analysis in a section of a city.

The combination of the two main sources is calculated thanks to the precision of both sources. In a given instant, for example Monday 1 May 2014 at 11:35:23 am the system and method of the present invention can have a high definition image of the city of Madrid from a satellite (or a movie) and, at the same time, from the Continuous Database "CDB" the system and method of the present invention have the information of all the probes (each being an individual vehicle or pedestrian, with one or more tracking devices such as GPS, a Mobile Phone, Cameras on the streets, etc.) at the very same time (FIG. 4, cars with navigator devices labeled in circles and cars identified by satellite labeled in rectangles). Each element then can be identified in the aerial image, one by one, in each street segment at the snapshot time, and also the number of other vehicles that are in the same segment of the street, so a skew ratio per segment, zone and day is calculated based on the probes in that segment and the real number of elements in that same street. This process is repeated many times across different time frames, days, weekends, etc. So a weighting factor is obtained for each probe that represents the projection of the total universe of the elements in the city. As probes are identified across time, a more meticulous measurement is possible, making the weighting ratio a combination of several analyses of the probe in different time frames, areas and days.

The system can be enhanced by projecting the patterns and flows over the census data to have a complete and weighted representation of the city The result of matching these two sources (snapshot of reality with a large longitudinal sample of elements) across time is a model that represents the traffic flow of each single element of the city. The model can be queried by any dimension, such as time, origin, destiny, duration, and profile. It can answer questions such as: "How many minutes has the duration of the journey to work of the people that go from Postal Code A to Postal Code B increased since there are some roads closed in the last month?; "What are the profile and origin of the people that suffer the traffic jam in the ring road of the city Monday morning?"; What is the influence area of the shopping mall during a regular weekend vs. holidays?; Forecast the people from the south borough that will move during the summer season outside of the city based on the last 3 years.

The analogy of the system is the US Census Bureau. They conduct the CENSUS Survey one time every several years to get the total universe of the population but they update it with smaller sample survey data annually. In this system, the Satellite image vehicle counting is the Universe and the other auxiliary sources such as Car Navigators or Beacons help to update the information and patterns.

The concept of the system matches the idea of a global real complete measurement with the Satellite image, that is done in a periodic time (i.e., each week) and secondary sources that are not complete and may be biased but help to update the information. The combination of both sources provides the unprecedented and most accurate estimation of the reality of trips in the city or region.

With the system and method of the present invention, a representation of all the journeys, trips and movements of all the people of the city is possible, a Trip Atlas of the city. The system and method of the present invention is a complete estimation from a single street to the whole city. The present invention can only be surpassed if all the people carried a GPS all the time and all that information was centralized and gathered in one place. That would be very expensive of course.

The present invention can be applied in combination with the invention of U.S. Pat. No. 8,537,145 of CUENDE INFOMETRICS, that calculates the visibility zone for each billboard or advertising panel in the street. With both inventions, audience metrics for these advertising elements can be obtained (Basically, how many people have the opportunity to see the billboard).

The system and method of the present invention can be enriched by adding other layers, for example, census information, weather conditions by zone, daylight frames per region or data from specific surveys such as media and brand consumption, political and environmental information, and social statuses, and all the new variables will provide a better understanding of the behavior and patterns of the population.

The system and method of the present invention can work "online" in real time and with historical data.

The present invention solves the issue of "duplications" of the traffic counts in the street. Currently, it is hard to know if one point "B" (segment of the street) has been passed by three different cars or the same car three times. More importantly, with the system and method of the present invention, it can be known how many cars that passed point "B" then go to "C or to "D". With the system and method of the present invention, an analysis from Origin-Destiny can be calculated using intermediate points: "How many people go from point "A" to "C" passing by "B" (toll highway) and how many go from "A" to "C" but avoid "B". This is in fact a very interesting example of analysis as the "toll highway" may have accurate counts of people going through the barrier, but does not have a count of how many are missing because they are out of their sight. Also, unless they do plate recognition and process it, they will not know the kind of duplication that is happening at the toll highway. This is a clear advantage of the present invention for design and planning of streets and roads.

This kind of analysis could be done also over time. The system and method of the present invention could provide answers to questions like, "How many new people go from 'A' to 'C' while passing by 'B'?" or "How frequently do people repeat 'B'?"

Also, it has a very useful, unprecedented approach for usage-based parking fee pricing in streets as it can measure the density of street parking at any given moment.

Satellites could be positioned ad-hoc to take pictures at a certain moment in a specific place. It means that the impact of strikes, manifestations, sport events, etc. would be measurable, not only counting people there but also detecting how traffic is affected in the whole city.

Nightly pictures will allow analysis of illumination vs. traffic, object visibility, energy consumption optimization, etc.

Public transport efficiency enhancement using people trips as optimization criteria would also be possible.

What is claimed is:

1. A system for measuring a real traffic flow of an area, the system comprising:
   images taken from a sky in time intervals of an area;
   continuous tracking data for a probe that is collected and provided by navigator manufacturers, map providers, route applications or by phone carriers that record cell towers, traffic counts, router connections, near-field-communication devices, and beacons that are able to geolocate the probe; the continuous tracking data comprising at least a longitude, latitude for each time unit for which the probe is tracked;
   a database of universe of elements that comprises the images;
   a continuous database that comprises the continuous tracking data; and
   a computer processor configured to:
      apply image pattern recognition software to the images taken from the sky so that each element comprised in the images is recognized, labeled and at least a latitude, longitude, time, speed and type of vehicle or number of pedestrians is calculated;
      allocate to each probe the continuous tracking data for which the longitude, latitude and time match;
      calculate a ratio between a number of elements recognized in the images and a number of probes for which the longitude, latitude and time match; and
      estimate the flow and the total number of elements within an area by applying the calculated ratio to the continuous tracking data for a particular time for which an image from the sky is not available.

2. The system of claim 1, wherein the computer processor is further configured to:
- calculate a pattern for each probe based on the continuous tracking data; and
- calculate a profile by analyzing combinations of the calculated patterns.

3. The system of claim 1, wherein the images are provided by at least one aerial device.

4. The system of claim 1, wherein the at least one aerial device is selected from a satellite, a plane, an aircraft, a drone and any combination thereof.

5. The system of claim 1, wherein the probe is selected from a tracked vehicle and a tracked pedestrian.

6. The system of claim 1, wherein the area is selected from a street, a suburb, a city, a town, a country and a continent.

7. The system of claim 1, wherein the images include at least one of photos and moving frames.

8. A method for measuring a real traffic flow of an area, the method comprising:
- generating a database of universes which stores images taken from a sky in time intervals of an area;
- recognizing, using a processor, each individual element comprised in each stored image and calculating at least the following data of each individual element: latitude, longitude, time, speed and type of vehicle or number of pedestrians;
- generating a continuous database which stores continuous tracking data of each individual probe, the continuous tracking data comprising at least an estimated position by longitude and latitude, map cell and vector position, for each time unit; the continuous tracking data being obtained from each tracking device carried by each individual probe;
- allocating, to each individual element recognized in the step of recognizing each individual element comprised in each stored image, the continuous tracking data for which the longitude, latitude and time match;
- calculating a ratio between the number of elements recognized in the images and the number of probes for which the longitude, latitude and time match; and
- estimating the flow and the total number of elements within an area by applying the calculated ratio to the continuous tracking data for a particular time for which an image from the sky is not available.

9. The method of claim 8, wherein the method further comprises:
- calculating a pattern for each probe based on the continuous tracking data; and
- calculating a profile by analyzing combinations of the calculated patterns.

10. The method of claim 8, wherein generating the database of universes further comprises:
- defining a Universe region which is a composition of several images;
- selecting different source data of aerial images selected from: a satellite, airplanes and drones, with latitude and longitude and a synchronized timestamp;
- normalizing the input image;
- generating a chronogram of the different images and regions to sync later with a snapshot of the continuous database;
- counting vehicle and pedestrian analysis;
- correcting and enhancing the data; and,
- counting elements.

11. The method of claim 8, wherein the step of counting vehicle and pedestrian analysis further comprises:
- mapping correlating of roads wherein roads and car parks are placed as vectors in the images to highlight where it is possible to find vehicles;
- calibrating, wherein objects are defined for the image recognition, the objects being at least: car, type, model, bus, truck, motorbike, bicycle, bus shelter, billboard, kiosk, urban furniture and pedestrian; and
- processing the images with image pattern recognition software based on a visible range, infrared and ultraviolet.

12. The method of claim 8, wherein the step of correcting and enhancing the data further comprises:
- matching to vector navigation map;
- correcting an effect of traffic lights or traffic jams for possible false positives as parked cars;
- deducing a movement and trajectory for each individual element before a snapshot and after the snapshot;
- forecasting the movement for each individual element based on type of road, type of element and speed; and
- identifying regions and locations to be excluded or requiring a different analysis.

13. The method of claim 8, wherein the step of counting elements further comprises:
- counting by segment of a street, number of vehicles, cars, buses, motorcycles, moving and parked, people and static probes for each image and for total images in a period of time; and
- counting a total for the area for each image and for total images in a period of time.

14. A method for measuring a real traffic flow of an area, the method comprising:
- generating a database of universes which stores images taken from a sky;
- normalizing the stored images of the database of universes;
- looking, using a computer processor, for elements of a continuous database which were in movement at a time of one of the stored images of the database of universes;
- assigning, using the computer processor, a weight to each probe of the continuous database in terms of elements with matching; and
- repeating, using the computer processor, the steps of looking for elements of the continuous database which were in movement at the time of one of the stored images of the database of universes and assigning the weight to each probe of the continuous database in terms of elements with matching, for each stored image, and combining the weights obtained;
- wherein the combination of weights takes into account at least whether it is a weekend or a working day, summer or winter; and
- wherein the weights are distributed among continuous database probes that never match with the database of universes elements by matching with other continuous database probes already weighted.

* * * * *